US009936381B2

United States Patent
Tabata et al.

(10) Patent No.: US 9,936,381 B2
(45) Date of Patent: Apr. 3, 2018

(54) WIRELESS COMMUNICATION DEVICE AND NON-TRANSITORY COMPUTER-READABLE MEDIUM

(71) Applicant: CASIO COMPUTER CO., LTD., Tokyo (JP)

(72) Inventors: Yuji Tabata, Ome (JP); Takahiro Tomida, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 106 days.

(21) Appl. No.: 14/854,686

(22) Filed: Sep. 15, 2015

(65) Prior Publication Data
US 2016/0157285 A1 Jun. 2, 2016

(30) Foreign Application Priority Data

Nov. 28, 2014 (JP) .................................. 2014-241164
Mar. 20, 2015 (JP) .................................. 2015-058568

(51) Int. Cl.
*H04L 29/06* (2006.01)
*H04L 9/00* (2006.01)
(Continued)

(52) U.S. Cl.
CPC ........... *H04W 12/04* (2013.01); *H04W 12/02* (2013.01); *H04W 56/001* (2013.01); *H04L 9/006* (2013.01); *H04L 63/0823* (2013.01)

(58) Field of Classification Search
CPC ... H04W 12/02; H04W 12/04; H04W 56/001; H04L 63/0823; H04L 9/006
See application file for complete search history.

(56) References Cited

U.S. PATENT DOCUMENTS 9,301,269 B1* 3/2016 Zhao .................... H04W 56/001
9,332,517 B2* 5/2016 Kim ................... H04W 56/0075
(Continued)

FOREIGN PATENT DOCUMENTS

JP 2012-507916 A 3/2012

*Primary Examiner* — Parth Patel
*Assistant Examiner* — Kai Chang
(74) *Attorney, Agent, or Firm* — Scully, Scott, Murphy & Presser, P.C.

(57) ABSTRACT

A master terminal transmits sound waves that are a synchronization signal from a speaker to a slave terminal at random time intervals. Upon acquiring the sound waves that are the synchronization signal by microphone, the slave terminal promptly transmits a response signal through wireless communication to the master terminal. The master terminal receives the response signal and a terminal ID transmitted from the slave terminal. The master terminal receives the response signal multiple times and determines whether time intervals when synchronization signals were transmitted and time intervals when response signals were received match. When the synchronization signal time intervals and the response signal time intervals match, the master terminal recognizes the slave terminal that transmitted response signals at time intervals matching the synchronization signal time intervals as a wireless communication connection target. Slave terminals that transmitted response signals at time intervals not matching the synchronization signal time intervals are excluded from wireless communication connection targets.

9 Claims, 19 Drawing Sheets

(51) Int. Cl.
    *H04W 12/02*     (2009.01)
    *H04W 12/04*     (2009.01)
    *H04W 56/00*     (2009.01)

(56) References Cited

U.S. PATENT DOCUMENTS

| | | | | |
|---|---|---|---|---|
| 2007/0060079 | A1* | 3/2007 | Nakagawa | G01S 5/06 |
| | | | | 455/131 |
| 2010/0086093 | A1* | 4/2010 | Sheet | H04J 3/0664 |
| | | | | 375/376 |
| 2011/0235560 | A1* | 9/2011 | Kurita | G08B 17/00 |
| | | | | 370/311 |
| 2013/0281074 | A1* | 10/2013 | Sousa | H04W 56/00 |
| | | | | 455/416 |
| 2014/0080518 | A1* | 3/2014 | Price | H04L 67/18 |
| | | | | 455/456.2 |
| 2014/0208102 | A1* | 7/2014 | Pryakhin | G06F 21/62 |
| | | | | 713/165 |
| 2014/0219270 | A1* | 8/2014 | Ro | H04W 56/002 |
| | | | | 370/350 |
| 2015/0131628 | A1* | 5/2015 | Chu | H04W 56/0015 |
| | | | | 370/336 |
| 2015/0264657 | A1* | 9/2015 | Abraham | H04W 56/001 |
| | | | | 370/311 |
| 2015/0304110 | A1* | 10/2015 | Oberheide | H04L 63/12 |
| | | | | 713/155 |
| 2015/0326359 | A1* | 11/2015 | Subramanian | H04L 5/0023 |
| | | | | 370/330 |
| 2015/0327045 | A1* | 11/2015 | Chang | H04W 8/005 |
| | | | | 370/329 |
| 2016/0073367 | A1* | 3/2016 | Li | H04W 56/001 |
| | | | | 370/350 |

\* cited by examiner

FIG. 6

| SYNCHRONIZATION SIGNAL TRANSMISSION TIME |
|---|
| ... |
| 12:30:25. 0035 |
| 12:30:25. 0138 |
| 12:30:25. 0166 |
| 12:30:25. 0322 |
| 12:30:25. 0385 |
| 12:30:25. 0427 |
| ... |

| TERMINAL ID | RESPONSE SIGNAL RECEPTION TIME |
|---|---|
| ... | ... |
| A | 12:30:25.0065 |
| B | 12:30:25.0077 |
| A | 12:30:25.0168 |
| A | 12:30:25.0196 |
| B | 12:30:25.0207 |
| A | 12:30:25.0352 |
| ... | ... |

FIG. 9

| SYNCHRONIZATION SIGNAL TIME INTERVAL | RESPONSE SIGNAL TIME INTERVAL FOR TERMINAL ID (A) | ABSOLUTE VALUE OF TIME INTERVAL DIFFERENCE |
|---|---|---|
| 0.050 | 0.042 | 0.008 |
| 0.155 | 0.180 | 0.025 |
| 0.334 | 0.332 | 0.002 |
| 0.089 | 0.102 | 0.013 |
| 0.534 | 0.554 | 0.020 |
| 0.898 | 0.870 | 0.028 |
| 0.035 | 0.048 | 0.013 |
| 1.207 | 1.180 | 0.027 |

FIG. 10

| SYNCHRONIZATION SIGNAL TIME INTERVAL | RESPONSE SIGNAL TIME INTERVAL FOR TERMINAL ID (B) | ABSOLUTE VALUE OF TIME INTERVAL DIFFERENCE |
|---|---|---|
| 0.050 | 0.042 | 0.008 |
| 0.155 | 0.180 | 0.025 |
| 0.334 | 0.332 | 0.002 |
| 0.089 | 0.102 | 0.013 |
| 0.534 | 0.554 | 0.020 |
| 0.898 | 0.870 | 0.028 |
| 0.035 | 1.257 | 1.222 |
| 1.207 | 0.323 | 0.884 |

FIG. 12

| TERMINAL ID | RESPONSE SIGNAL |
|---|---|

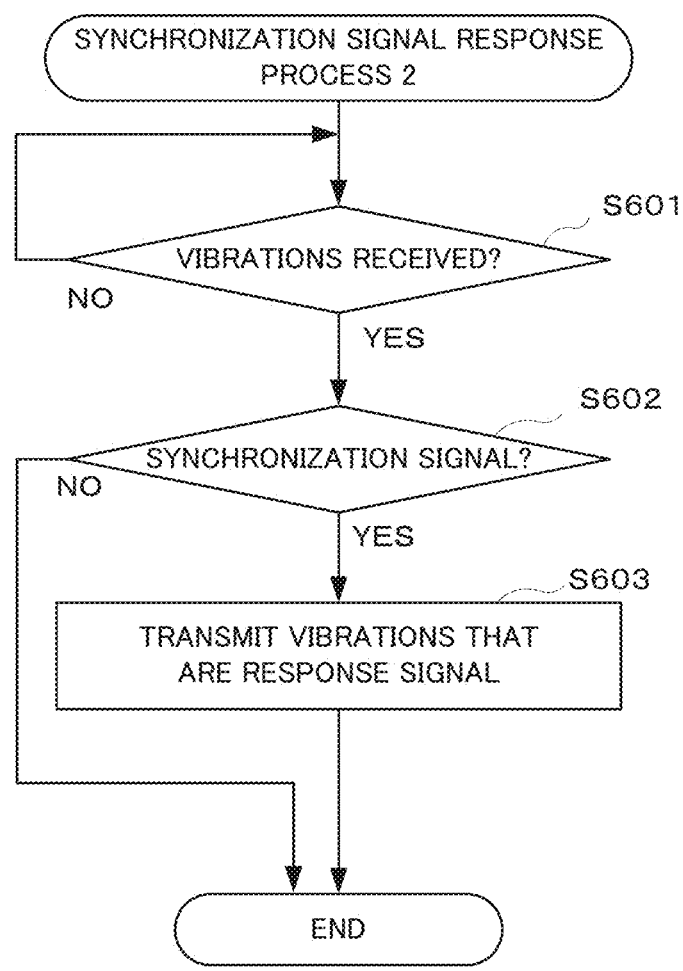

US 9,936,381 B2

WIRELESS COMMUNICATION DEVICE AND NON-TRANSITORY COMPUTER-READABLE MEDIUM

CROSS-REFERENCE TO RELATED APPLICATION

This application claims the benefit of Japanese Patent Application No. 2014-241164, filed on Nov. 28, 2014, and Japanese Patent Application No. 2015-058568, filed on Mar. 20, 2015, the entire disclosures of which are incorporated by reference herein.

FIELD

This application relates generally to a wireless communication device and a non-transitory computer-readable medium.

BACKGROUND

In short-distance wireless communication using radio waves, as exemplified by Bluetooth®, a master (wireless communication device) pairs with a slave (another wireless communication device), a connection between the master and the slave is established, and information communication between the two becomes possible.

Even when the slave is at a location separated from the master (for example, outside a room and/or the like), if the slave is within the communication range, a connection between the slave and the master is established and information communication becomes possible. However, there are times when it is desirable for information communication with the master to be limited to slaves existing in the vicinity (for example, within a room and/or the like) of the master, so it is desirable to have a wireless communication device that permits connections limited to slaves existing in the neighborhood of the master.

A pairing method for wireless communication through which a slave can be paired with a master existing within a range reached by sound is disclosed in National Publication No. 2012-507916. Specifically, the slave transmits a personal identification number (PIN) included in an audio signal to the master. Next, the master pairs with the slave by receiving that PIN, and establishes a connection.

However, with the paring method disclosed in National Publication No. 2012-507916, the process becomes cumbersome because the PIN must be extracted from the audio signal.

In consideration of the foregoing, it is an objective of the present disclosure to accomplish highly safe wireless communication without the process becoming cumbersome.

SUMMARY

In order to achieve the objective of the present disclosure, a wireless communication device according to a first exemplary aspect of the present disclosure comprises:

a transmitter configured to transmit a synchronization signal multiple times;

an receiver configured to receive response signals transmitted by another wireless communication device that has received the synchronization signal; and a processor configured to compare a time interval when the synchronization signal was sent and a time interval when the response signal was received, and recognize the other wireless communication as a connection target based on the comparison results.

BRIEF DESCRIPTION OF THE DRAWINGS

A more complete understanding of this application can be obtained when the following detailed description is considered in conjunction with the following drawings, in which:

FIG. 6 is a drawing showing a synchronization signal transmission time list according to the first exemplary embodiment of the present disclosure;

FIG. 8 is a drawing showing a response signal reception time list according to the first exemplary embodiment of the present disclosure;

FIG. 9 is a drawing showing a first table of synchronization signal time intervals, response signal time intervals and the absolute values of the differences between these, according to the first exemplary embodiment of the present disclosure;

FIG. 10 is a drawing showing a second table of synchronization signal time intervals, response signal time intervals and the absolute values of the differences between these, according to the first exemplary embodiment of the present disclosure;

FIG. 12 is a drawing showing data contained in the response signal according to the first exemplary embodiment of the present disclosure;

FIG. 19 shows a flowchart of a synchronization signal response process according to the second exemplary embodiment of the present disclosure.

DETAILED DESCRIPTION

Figure 1:
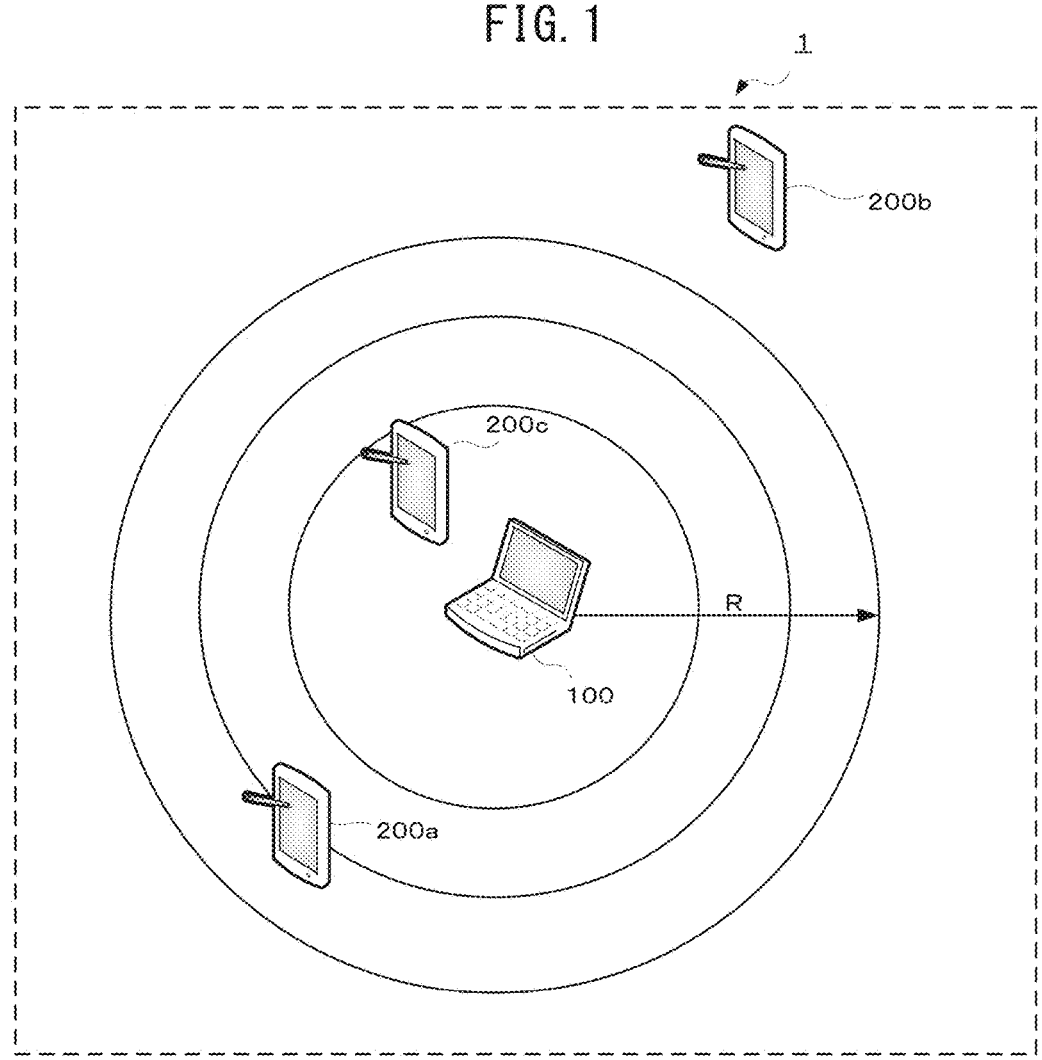
FIG. 1 is a drawing showing a configuration of a wireless communication system according to a first exemplary embodiment of the present disclosure.

Below, a wireless communication device according to exemplary embodiments of the present disclosure is described with reference to the drawings. Same or corresponding parts in the drawings are labeled with the same reference symbols.

First Exemplary Embodiment

FIG. 1 is a drawing showing a configuration of a wireless communication system according to a first exemplary embodiment of the present disclosure. In the exemplary configuration of FIG. 1, a wireless communication system 1 comprises a master terminal 100 that is a wireless communication device, and a slave terminal 200 that is a wireless communication device. The master terminal 100 and multiple slave terminals 200a to 200c accomplish wireless communications with each other on the basis of a short-distance wireless communication standard called Bluetooth®.

The master terminal 100 is a desktop or notebook personal computer, and/or the like. On the other hand, the slave terminals 200a to 200c are smartphones, tablet personal computers, and/or the like. When it is not necessary to specially differentiate the various slave terminals 200a to 200c, in the explanation below these shall be collectively referred to as the slave terminal 200.

In order for the master terminal 100 and the slave terminal 200 to accomplish wireless communication with each other, it is necessary to recognize the slave terminal 200 as a connection target and to establish a connection (pairing) with the slave terminal 200 recognized as a connection target. Using the time lag at which sound waves of synchronization signals arrive, the master terminal 100 can recognize only slave terminals 200 in the vicinity as connection targets, with slave terminals 200 in distant locations excluded from being connection targets.

The master terminal 100 transmits (sends) to the slave terminal 200 an audio wave that is a synchronization signal, at random time intervals. The synchronization signal is a signal transmitted in order to convey to the slave terminal 200 timing for transmitting response signals. Next, the slave terminal 200 transmits a response signal to the master terminal 100 through wireless communication promptly upon receiving (acquiring) the audio wave that is the synchronization signal. The master terminal 100 receives the response signal transmitted from the slave terminal 200 after transmitting the synchronization signal and before transmitting the next synchronization signal. Even when the time interval for transmitting synchronization signals is short, the master terminal 100 can receive without omission response signals from the slave terminals 200a and 200c at locations closer than a distance R. On the other hand, because it takes time for the audio wave to reach the slave terminal 200b at a location more distant than the distance R, when the time interval for transmitting synchronization signals is short the master terminal 100 cannot receive a response signal from the slave terminal 200b that is far away.

When response signals are received from each of the slave terminals 200, the master terminal 100 determines whether or not the time intervals at which the synchronization signals were transmitted to each of the slave terminals 200 and the time intervals at which response signals were received match. Because the master terminal 100 receives the response signals from the slave terminals 200a and 200c at locations closer than the distance R without omission, the time intervals of the response signals from the slave terminals 200a and 200c and the time intervals of the synchronization signals match. On the other hand, because there is omission in the master terminal 100 receiving response signals from the slave terminal 200b at a location more distant than the distance R, the time intervals of response signals from the slave terminal 200b and the time intervals of the synchronization signal do not match. The master terminal 100 excludes the slave terminal 200b for which the time intervals of the synchronization signals and the time intervals of the response signals do not match from being a connection target, and recognizes as connection targets the nearby slave terminals 200a and 200c for which the time intervals match. In addition, when the slave terminal 200b approaches to within the distance R from the master terminal so that the time intervals of the synchronization signals and the time intervals of the response signals match, the master terminal 100 recognizes the slave terminal 200b as a connection target. In addition, when the slave terminals 200a and/or 200c move more distant than the distance R from the master terminal 100 so that the time intervals of the synchronization signals and the time intervals of the response signals do not match, the master terminal 100 excludes the slave terminals 200a and/or 200c separated by more than the distance R from being connection targets. As a result, the master terminal 100 recognizes only the slave terminals 200 at a distance closer than the distance R as connection targets. In addition, because the master terminal 100 transmits synchronization signals at random time intervals, when a slave terminal at a location that cannot receive the synchronization signals transmits a response signal without receiving a synchronization signal, the time intervals of the synchronization signals and the time intervals of the response signals do not match, so that slave terminal is excluded from being a connection target. Below, the configuration of the master terminal 100 according to this exemplary embodiment is described.

Figure 2:
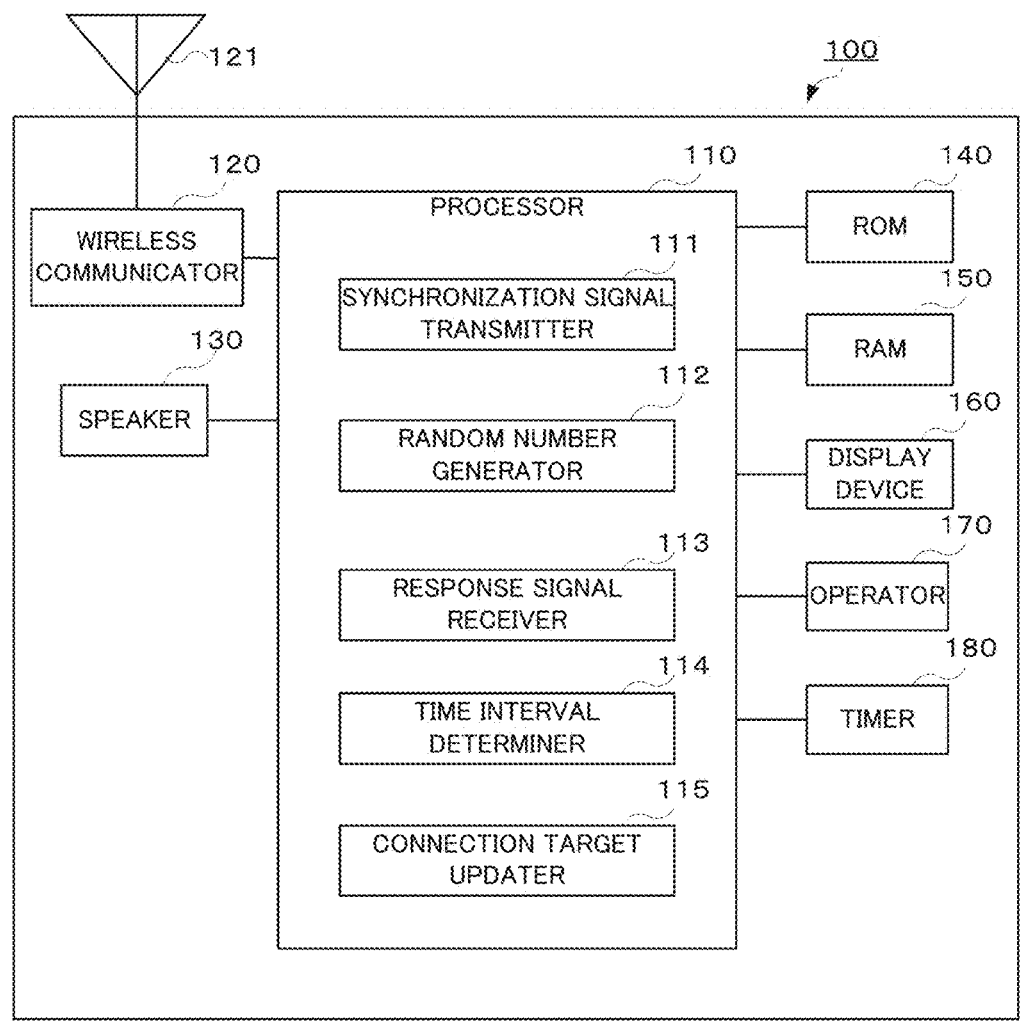
FIG. 2 is a block diagram showing a configuration of a master terminal according to the first exemplary embodiment of the present disclosure.

As shown in FIG. 2, the master terminal 100 comprises a processor 110, a wireless communicator 120, an antenna 121, a speaker 130, a read-only memory (ROM) 140, a random access memory (RAM) 150, a display device 160, an operator 170 and a timer 180.

The processor 110 comprises a central processing unit (CPU) and/or the like. The processor realizes functions with which the master terminal 100 is endowed, by executing software processes in accordance with programs stored in the ROM 140 (for example, programs for realizing the below-described synchronization signal transmission process, response signal reception process, and/or the like). With this configuration, the processor 110 functions as a synchronization signal transmitter 111, a random number generator 112, a response signal receiver 113, a time interval determiner 114 and a connection target updater 115.

The synchronization signal transmitter 111 transmits synchronization signals that are sound waves from the speaker 130 to the slave terminal 200, and stores the transmission time of the synchronization signals, measured by the timer 180 in 0.001-second increments, in a synchronization signal transmission time list in the RAM 150. The random number generator 112 generates a random value, and determines a response wait time W for receiving a response signal from the slave terminal 200 on the basis of the generated value. The range of the response wait time W is Wmin≤W≤Wmax.

The value of Wmin is not particularly limited, but is determined on the basis of the time it takes for sound waves to reach slave terminals 200 in the range of distance with which the user wants to connect, from the master terminal 100. For example, assuming that the speed of sound waves is 340 (m/s), that the distance from the master terminal 100 to the slave terminals 200 in the range in which the user wants to connect is R (m), and the time from when the slave terminal 200 receives a synchronization signal until a response signal is transmitted is D (s), then Wmin=R/340+D (s). For example, assuming R=10 (m) and D=0.02 (s), then Wmin=0.05 (s). The value of Wmax is not particularly limited, but for example is set so that Wmax=50×Wmin.

The response signal receiver 113 receives the response signal received by the wireless communicator 120, via the antenna 121. From which slave terminal 200 the received response signal was transmitted is identified on the basis of a terminal ID included in the response signal. The information of the terminal ID identifying the slave terminal 200 from which the response signal was transmitted, and the reception time of the response signal measured by the timer 180 in 0.001-second increments, are stored in the response signal reception list of the RAM 150.

The time interval determiner 114 compares the time interval in which the synchronization signal was transmitted to each of the slave terminals 200 and the time interval in which the response signal was received, and determines that these match if within an error range. The error range is not particularly limited, but is determined from the performance of the master terminal 100 and/or the like and the value of Wmin, and/or the like, and for example can be set to 0.03 (s).

When the time interval determiner 114 determines that the time intervals of the transmission times of the synchronization signal and the time intervals of the reception times of the response signals match, the connection target updater 115 recognizes the slave terminal 200 for which the time intervals of the synchronization signal and the response signal match as a connection target. The connection target updater 115 establishes a connection for wireless communication with the slave terminal 200 recognized as a connection target by receiving operation from the user, or automatically establishes a connection for wireless communication with the slave terminal 200 recognized as a connection target. When it is determined that the time intervals of the synchronization signal and the time intervals of the response signals do not match, slave terminals 200 for which the synchronization signal and response signal time intervals do not match are excluded from being connection targets.

The wireless communicator 120 comprises, for example, a radio frequency (RF) circuit, a base band (BB) circuit and/or the like. The wireless communicator 120 accomplishes sending and receiving of wireless signals based on Bluetooth, via the antenna 121.

The speaker 130 transmits the synchronization signal through sound waves. The sound waves transmitted from the speaker 130 are not particularly limited but for example are ultrasonic waves.

The ROM 140 comprises non-volatile memory such as flash memory and/or the like, and as noted above stores programs and data for the processor 110 to realize various functions. The RAM 150 comprises volatile memory, and is used as a work space for storing programs with which the processor 110 accomplishes various processes.

The display device 160 comprises a liquid crystal display and/or the like, and displays information conveyed from the processor 110. The operator 170 comprises an operation-receiving device for receiving user operations, such as a touch panel, a keyboard, a button, a pointing device and/or the like, and a conveyance unit for conveying to the processor 110 information about operations the operation-receiving device received. The operator 170 is used for inputting the user's operation contents to the master terminal 100.

The timer 180 is a timer capable of measuring the actual time with a precision of one-thousandth of a second, and measures transmission times of synchronization signals and reception times of response signals.

Figure 3:
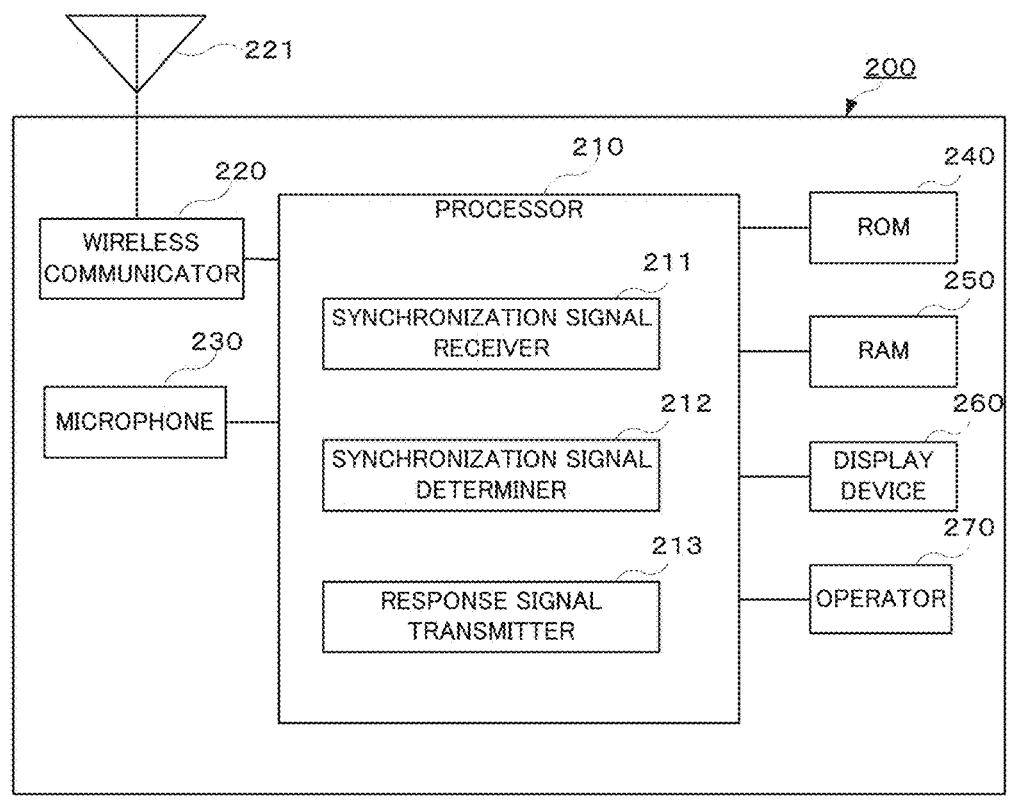
FIG. 3 is a block diagram showing a configuration of a slave terminal according to the first exemplary embodiment of the present disclosure.

The slave terminal 200 shown in FIG. 3 comprises a processor 210, a wireless communicator 220, an antenna 221, a microphone 230, a ROM 240, a RAM 250, a display device 260 and an operator 270.

The processor 210 comprises a CPU. The processor 210 realizes various functions with which the slave terminal 200 is equipped, by executing software processes in accordance with programs (for example, a program for realizing the below-described synchronization signal reception process) stored in the ROM 240. With this configuration, the processor 210 functions as a synchronization signal receiver 211, synchronization signal determiner 212 and response signal transmitter 213.

The synchronization signal receiver 211 receives sound waves input via the microphone 230.

The synchronization signal determiner 212 determines whether or not a synchronization signal transmitted from the master terminal 100 is included in the sound waves received by the synchronization signal receiver 211.

The response signal transmitter 213 promptly transmits a response signal to the master terminal 100 through wireless communication, from the wireless communicator 220 via the antenna 221, when the synchronization signal determiner 212 determines that a synchronization signal is included.

The wireless communicator 220 comprises a wireless frequency circuit, a baseband circuit, and/or the like. The wireless communicator 220 accomplishes sending and receiving of wireless signals based on Bluetooth, via the antenna 221.

The microphone 230 receives the synchronization signal transmitted by sound waves from the speaker 130 of the master terminal 100, and converts this signal into an electrical signal.

The ROM 240 comprises non-volatile memory such as flash memory and/or the like, and stores data, the terminal ID of the terminal and programs with which the processor 210 realizes various functions. The RAM 250 comprises volatile memory and is used as a work area for storing data with which the processor 210 accomplishes various processes.

Figure 4:
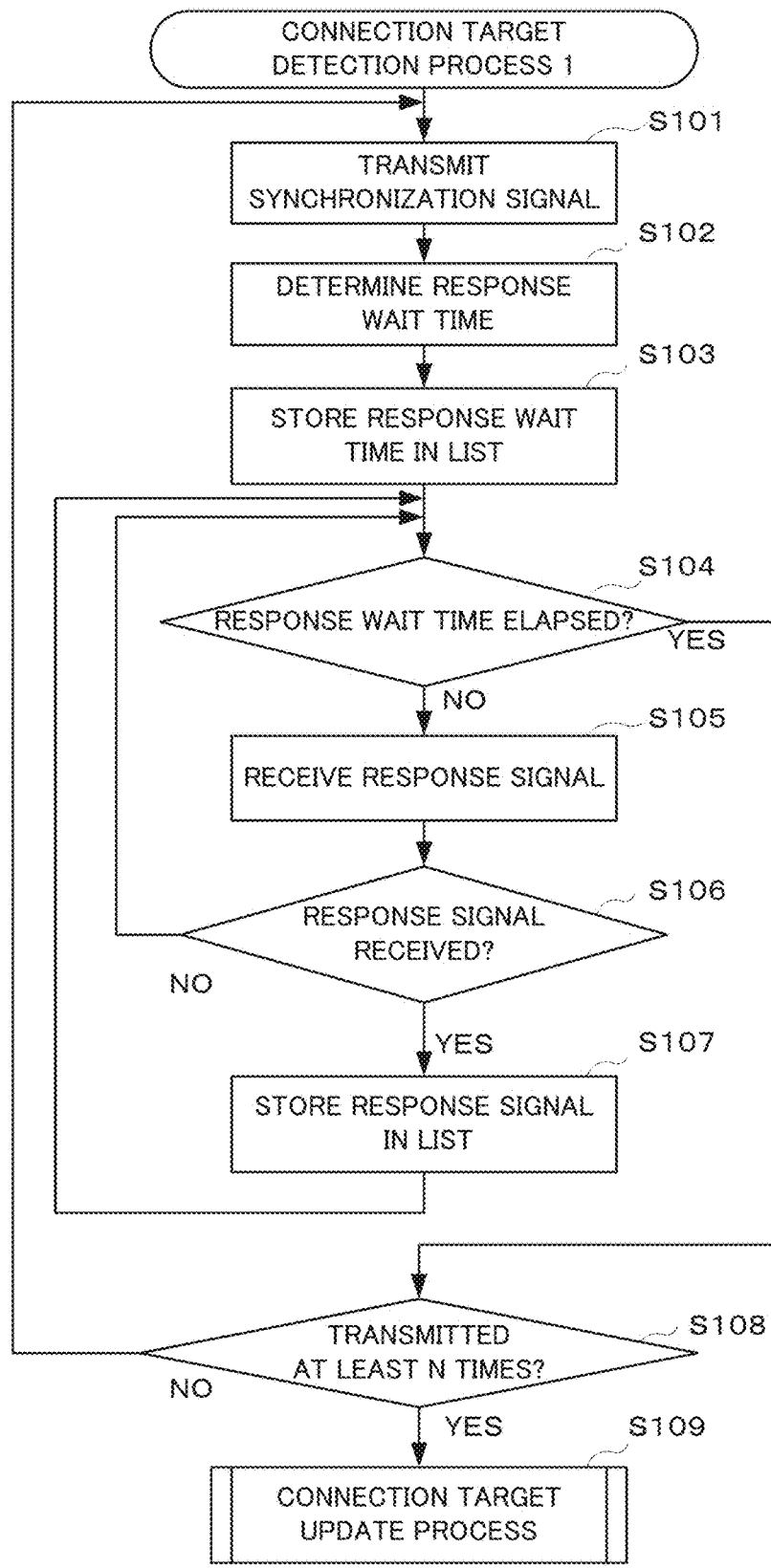
FIG. 4 shows a flowchart for a connection target detection process according to the first exemplary embodiment of the present disclosure.

A connection target detection process 1 that is a process prerequisite to the master terminal 100 recognizing the slave terminal 200 as a connection target is described here with reference to the flowchart shown in FIG. 4.

Figure 7:
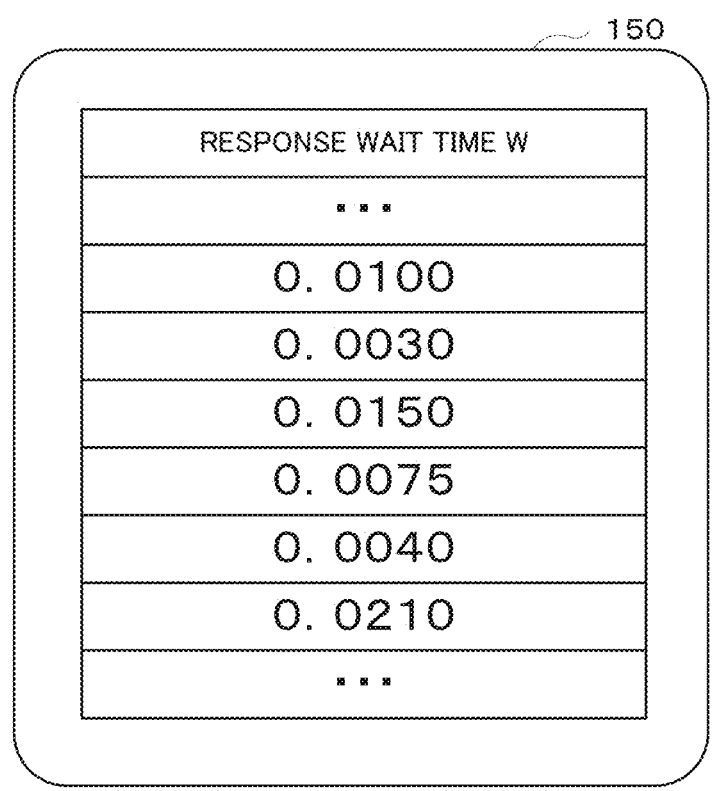
FIG. 7 is a drawing showing a response wait time list according to the first exemplary embodiment of the present disclosure.

The master terminal 100 starts the connection target detection process 1 simultaneously with startup or in response to a user operation. The synchronization signal transmitter 111 transmits sound waves that are a synchronization signal to the slave terminal 200 from the speaker 130, and stores the time at which the synchronization signal was transmitted in a synchronization signal transmission time list shown in FIG. 6 (step S101). The master terminal 100 determines a response wait time W on the basis of a random number generated by the random number generator 112 (step S102). The master terminal 100 stores the response wait time W in a response wait time W list shown in FIG. 7 (step S103).

Next, a determination is made as to whether the newest response wait time W stored in the response wait time W list has elapsed since the newest transmission time stored in the synchronization signal transmission time list (step S104). Specifically, a determination is made, for example, as to whether 0.0210, being the newest response wait time shown in FIG. 7, has not elapsed from 12:30:25.0427, being the newest synchronization signal transmission time shown in FIG. 6. When it is determined that the response wait time has not elapsed (step S104: No), the master terminal 100 accomplishes the following process.

The response signal receiver 113 identifies whether a response signal transmitted to the wireless communicator 120 from a slave terminal 200 has been transmitted from any slave terminal 200 during the response wait time W, and receives the response signal (step S105). Next, a determination is made as to whether a response signal was received (step S106). When a response signal has not been received (step S106: No), the master terminal 100 returns to the process in step S104. When a response signal was received (step S106: Yes), information (terminal ID) identifying from which slave terminal 200 the response signal was transmitted, and the response signal reception time, are stored in the response signal reception time list shown in FIG. 8 (step S107). Following this, the master terminal 100 returns to the process in step S104. In this manner, the processes in steps S104 to S107 loop until the response wait time elapses.

When it is determined that the response wait time has elapsed (step S104: Yes), the master terminal 100 determines whether the synchronization signal was transmitted N or more times (step S108). When the synchronization signal was transmitted N or more times (step S108: Yes), the master terminal 100 accomplishes a connection target update process that determines whether the slave terminal 200 that transmitted the response signal is a connection target (step S109). When the synchronization signal was not transmitted N or more times (step S108: No), the master terminal 100 returns to step S101. In this manner, the processes in steps S101 to S107 loop until the synchronization signal is transmitted N or more times.

Next, a connection target update process 1 is described with reference to the flowchart shown in FIG. 5. First, a determination is made as to whether for all slave terminals 200 the synchronization signal time intervals and the response signal time intervals have been compared and a determination made that these intervals are within a fixed error range (step S201). When the determination has not been made for all slave terminals 200 (step S201: No), the master terminal 100 sets the terminal ID of a slave terminal 200 for which determination has not been made (step S202). When there are multiple terminals 200 for which determination has not been made, the master terminal 100 arbitrarily selects one of these and sets the terminal ID. Next, the master terminal 100 extracts the response signal reception time of this terminal ID (step S203). The master terminal 100 finds the absolute values of the differences between the time intervals of response signal reception times for the terminal ID extracted the past N times as shown in FIG. 9, and the past N time intervals of the synchronization signal (step S204). The value of N is not particularly limited, but it is possible to assume that N=8. The master terminal 100 determines whether the absolute values of the differences between the time intervals of the synchronization signal transmission times and the time intervals of the response signal reception times are all not greater than a fixed value (within an error range) (step S205). Here, assume the error range is 0.03 (s). The absolute values of the differences in the time intervals shown in FIG. 9 are all 0.03 (s) or less, so it is determined that these match within the fixed error range. It would also be fine to determine in step S205 whether the average of the absolute values of the differences between the synchronization signal time intervals and the response signal time intervals is within a fixed error range.

When the synchronization signal time intervals and the response signal time intervals match within the error range (step S205: Yes), the master terminal 100 identifies the slave terminal 200 for which the time intervals of the transmission times and the time intervals of the response times match within the error range as a connection target. The master terminal 100 stores the terminal ID of the slave terminal 200 identified as a connection target in the connection target ID list. The master terminal 100 displays the terminal ID of the slave terminal 200 and establishes a connection with the slave terminal 200 automatically or by receiving a user operation. Following this, the master terminal 100 returns to step S201.

On the other hand, returning to step S205, as another example, among the absolute values of the differences in time intervals shown in FIG. 10, the seventh and eighth values exceed the fixed value (error range) of 0.03 (s), so these are determined to not match within the fixed error range. When the time intervals of the synchronization signals and the time intervals of the response signals do not match within the error range (step S205: No), the slave terminals 200 not fitting in the error range are excluded from being connection targets (step S207). When a slave terminal 200 not fitting in the error range is connected to the master terminal 100, the connection to this slave terminal 200 is interrupted. Following this, that terminal ID is excluded from the connection target ID list and the master terminal 100 returns to step S201.

When a determination as to whether the synchronization signal time intervals and the response signal time intervals match has been made for all slave terminal IDs (step S201: Yes), the connection target update process concludes. By repeating this process, the master terminal 100 makes only nearby slave terminals 200 connection targets.

Next, a synchronization signal response process 1 accomplished by the slave terminal 200 in order to establish a connection with the master terminal 100 is described with reference to the flowchart in FIG. 11. The slave terminal 200 starts the process of receiving sound waves simultaneously with startup or in response to user operation. First, the synchronization signal receiver 211 receives sound waves via the microphone 230 (step S301).

Next, the synchronization signal determiner 212 determines whether the sound waves received in step S301 are a synchronization signal (step S302).

Figure 12:
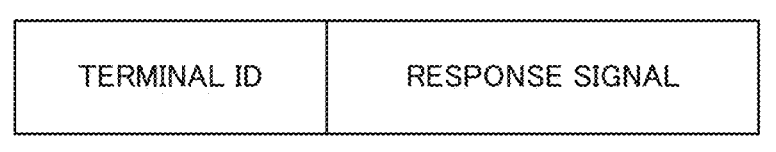

When it is determined that the sound waves are a synchronization signal (step S302: Yes), the response signal transmitter 213 promptly transmits a response signal containing the terminal ID of the terminal to the master terminal 100 from the wireless communicator 220 (step S303), and the process concludes. The response signal contains terminal ID information and information to the effect that this is a response signal, as shown in FIG. 12. When it is determined that the sound waves are not a synchronization signal (step S302: No), the process concludes. When the master terminal 100 is nearby, it is possible for the slave terminal 200 to establish a connection by repeating this process.

Figure 13:
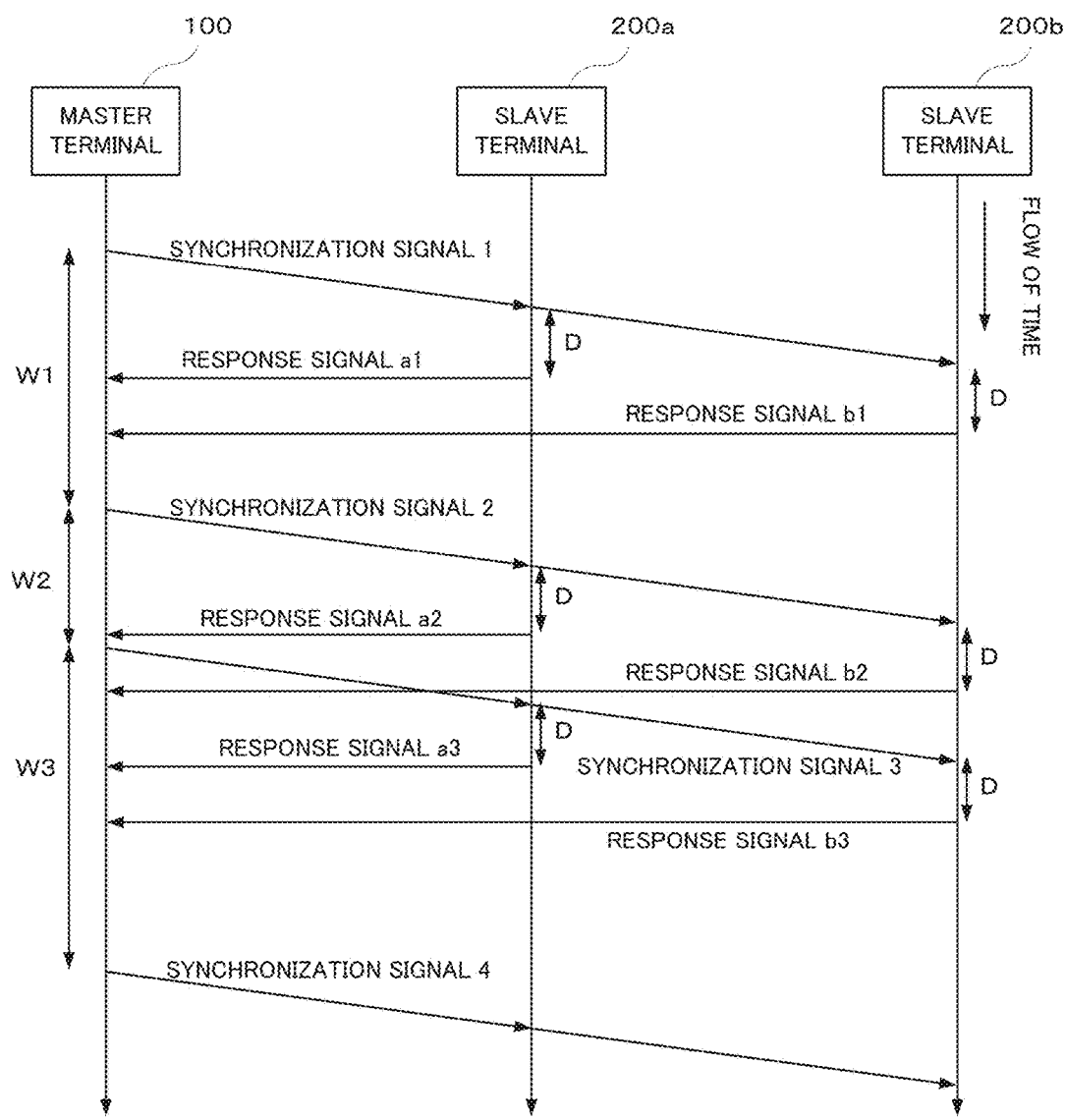
FIG. 13 is a drawing showing a sequence of wireless communications according to the first exemplary embodiment of the present disclosure.

Next, a process executed by the master terminal 100 according to this exemplary embodiment is explained with reference to the sequence charge in FIG. 13, based on a specific example. A wireless communication sequence between the master terminal 100 and the slave terminals 200a and 200b is shown in FIG. 13. In this exemplary embodiment, the master terminal 100 can recognize only slave terminals 200 at a close distance as connection targets, and can exclude slave terminals 200 at far distances from being connection targets.

The distance from the master terminal 100 to the slave terminal 200a is shorter than the distance from the master terminal 100 to the slave terminal 200b. In addition, as a premise in the example of FIG. 13, the master terminal 100 compares the past three time intervals of response signals from the slave terminal 200 and time intervals of synchronization signals and, upon determining that these match within the error range, recognizes slave terminals 200 that match as connection targets.

Synchronization signals 1 through 4 are sound waves of synchronization signals transmitted from the master terminal 100. When it is not necessary to specially differentiate the synchronization signals 1 through 4, these will be described hereafter collectively as the synchronization signal. Response signals a1 through a3 and b1 through b3 are response signals transmitted to the master terminal 100 from the slave terminals 200a and 200b. When it is not necessary to specially differentiate the response signals a1 through a3 and b1 through b3, these will be described hereafter collectively as the response signal.

The master terminal 100 transmits the synchronization signal 1 to the slave terminals 200a and 200b by sound waves, and stores the synchronization signal transmission time in the synchronization signal transmission time list (FIG. 4, step S101). The reason the arrows indicating the synchronization signals 1 through 4 are slanted is because the synchronization signals, being transmitted by sound waves, arrive later at far distances. The slave terminal 200a that is close receives the synchronization signal first, and the slave terminal 200b that is distant receives the synchronization signal later than the slave terminal 200a (FIG. 11, step S301).

Figure 11:
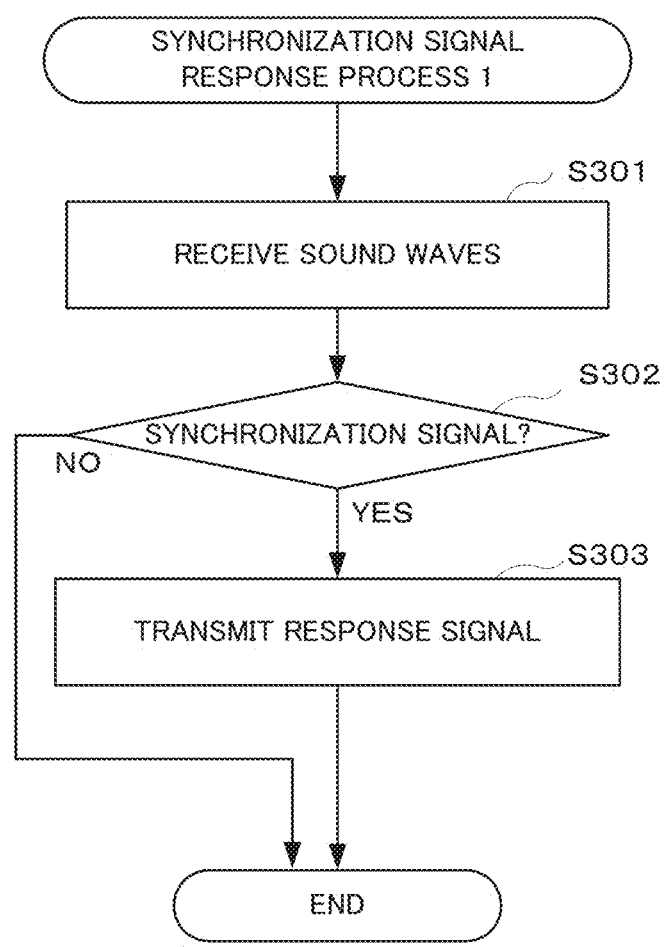
FIG. 11 shows a flowchart of a synchronization signal response process according to the first exemplary embodiment of the present disclosure.

The slave terminal 200a that has received the synchronization signal 1 transmits the response signal a1 to the master terminal 100 (FIG. 11, step S303). Similarly, the slave terminal 200b that has received the synchronization signal 1 transmits the response signal b1 to the master terminal 100 (FIG. 11, step S303).

The response signal a1 and the response signal b1 reach the master terminal 100 within the response wait time W1, so the master terminal 100 receives the response signal a1 and the response signal b1 (FIG. 4, step S105). The master terminal 100 stores the reception time of the received response signal a1 and the terminal ID of the slave terminal 200a, and the reception time of the response signal b1 and the terminal ID of the slave terminal 200b, in the response signal reception time list (FIG. 4, step S107).

Next, a case in which the value of the response wait time W is made smaller is described. A response wait time W2 is shorter than the response wait time W1. The master terminal 100 transmits the synchronization signal 2 to the slave terminals 200a and 200b by sound waves (FIG. 4, step S101). The slave terminal 200b that is distinct receives the synchronization signal after the slave terminal 200a.

The slave terminal 200a that has received the synchronization signal 2 transmits the response signal a2 to the master terminal 100 (FIG. 11, step S303). The slave terminal 200b that has received the synchronization signal 2 transmits the response signal b2 to the master terminal 100 (FIG. 11, step S303).

Because the response signal a2 reaches the master terminal 100 within the response wait time W2, the master terminal 100 receives the response signal a2 (FIG. 4, step S105). On the other hand, because the response signal b2 is transmitted later than the response signal a2, the response signal b2 does not reach the master terminal 100 within the response wait time W2, and the master terminal 100 does not receive the response signal b2. The master terminal 100 stores only the reception time of the received response signal a2 and the terminal ID of the slave terminal 200a in the response signal list (FIG. 4, step S107).

Next, the master terminal 100 transmits the synchronization signal 3 to the slave terminals 200a and 200b (FIG. 4, step S101). The response wait time W of the synchronization signal 3 is not short like the synchronization signal 1, so the master terminal 100 receives the response signals a3 and b3 from the slave terminals 200a and 200b (FIG. 4, step S105). The master terminal 100 stores the reception time of the received response signal a3 and the terminal ID of the slave terminal 200a, and the reception time of the response signal b3 and the terminal ID of the slave terminal 200b, in the response signal reception time list (FIG. 4, step S107). Following this, as described above the master terminal 100 transmits synchronization signals at random time intervals and receives response signals from the slave terminals 200 in the response wait time W. Next, the connection target update process executed after the master terminal 100 has transmitted the synchronization signal 3 is described.

Figure 5:
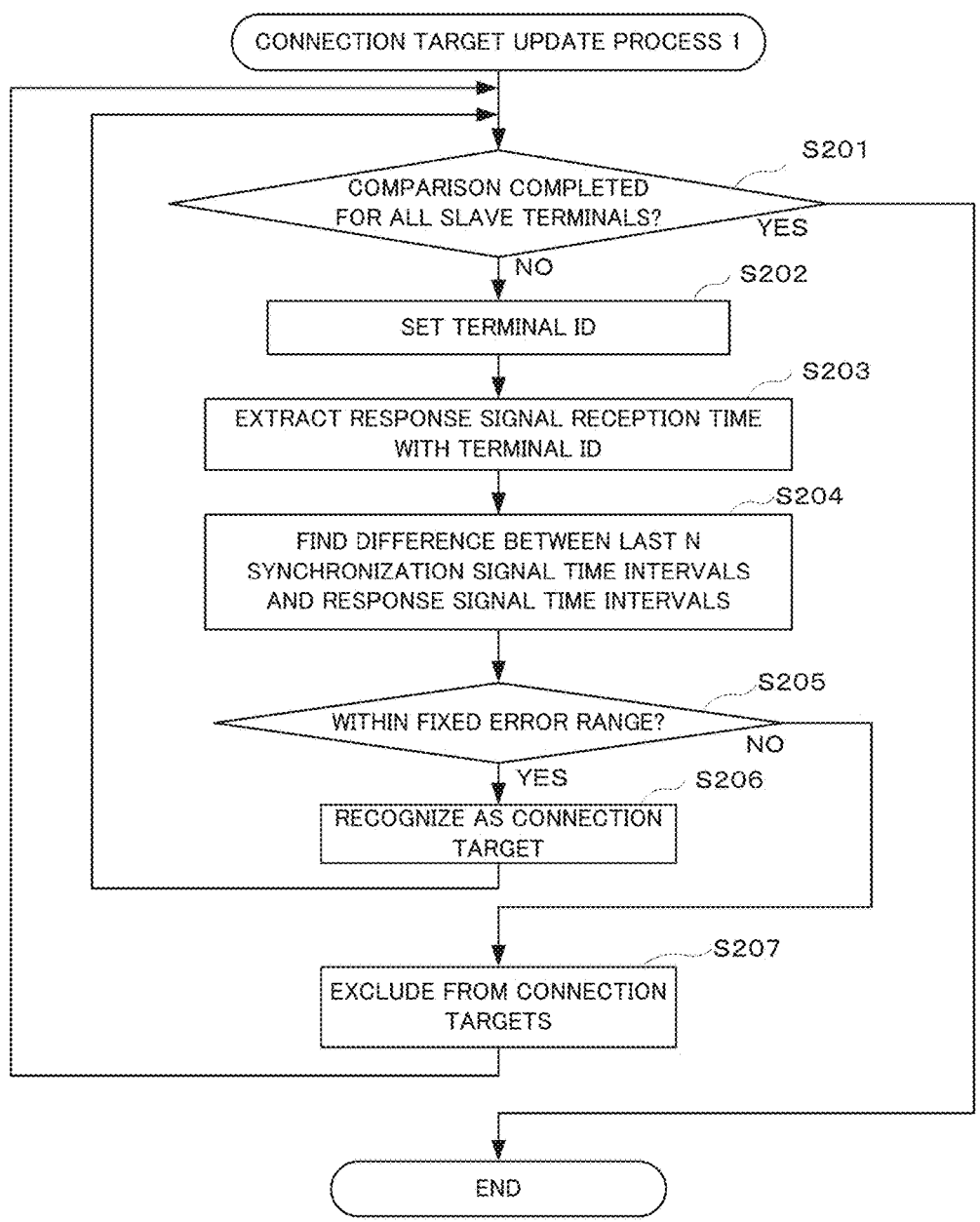
FIG. 5 shows a flowchart for a connection target update process according to the first exemplary embodiment of the present disclosure.

The master terminal 100 finds the absolute values of the differences between the synchronization signal time intervals and the past three response signal time intervals from the slave terminal 200a (FIG. 5, step S204), and determines whether these are within a fixed error range (FIG. 5, step S205). The past three synchronization signals transmitted from the master terminal 100 are synchronization signals 1, 2 and 3. Because a synchronization signal is transmitted for each response wait time W, the time interval between the synchronization signal 1 and the synchronization signal 2 is W1, and the time interval between the synchronization signal 2 and the synchronization signal 3 is W2. The past three response signals stored in the response signal reception time list of the slave terminal 200a are the response signals a1, a2 and a3. The time intervals of the past three response signals are the time interval between the response signals a1 and a2, and the time interval between the response signals a2 and a3. Because the slave terminal transmits a response signal promptly upon receiving a synchronization signal, the time interval between the response signals a1 and a2 matches W1, and the time interval between the response signals a2 and a3 matches W2, within the error range.

Similarly, the master terminal 100 finds the absolute values of the differences between the synchronization signal time intervals and the past three response signal time intervals from the slave terminal 200b (FIG. 5, step S204), and determines whether these are within a fixed error range (FIG. 5, step S205). Because the master terminal 100 transmits synchronization signals each response wait time W, the time interval between transmission times for the synchronization signal 1 and the synchronization signal 2 is W1, and the time interval between the synchronization signal 2 and the synchronization signal 3 is W2. The past three response signals stored in the response signal reception time list of the slave terminal 200b are response signals b0, b1 and b3. The response signal b0 is the response signal corresponding to the synchronization signal 0 transmitted prior to the synchronization signal 1. In addition, the synchronization signal b2 is not stored in the response signal reception time list because the master terminal 100 cannot receive this response signal by the response wait time W. The time intervals of the past three response signals are the time interval between the response signals b0 and b1, and the time interval between the response signals b1 and b3. It is unclear whether the time interval between the response signals b0 and b1 matches W1 within the error range, and the time interval between the response signals b1 and b3 is roughly W1+W2, and thus does not match W2 within the error range.

The master terminal 100 recognizes the slave terminal 200*a*, for which the synchronization signal time intervals and the response signal time intervals match within the error range, as a connection target and establishes a connection. On the other hand, the master terminal 100 excludes the slave terminal 200*b*, for which the synchronization signal time intervals and the response signal time intervals do not match within the error range, from being a connection target.

The relationship between the response wait time W and the distance between the master terminal 100 and the slave terminal 200 will now be explained. Suppose that the speed of sound is 340 (m/s) and the distance between the master terminal 100 and the slave terminal 200 is R (m). In addition, suppose that the time from when the slave terminal 200 receives the synchronization signal until a response signal is transmitted is D (s). The time it takes for a sound wave transmitted from the master terminal 100 to reach the slave terminal 200 is R/340 (s). The time T from when the synchronization signal is transmitted from the master terminal until the slave terminal 200 transmits a response signal is R/340+D (s). In this exemplary embodiment, the response signal is transmitted using electromagnetic waves, so the time needed for the response signal to reach the master terminal 100 from the slave terminal 200 is ignored.

When R/340+D (s) is not greater than the response wait time W, the master terminal 100 can receive the response signal within the response wait time W. In contrast, when R/340+D (s) is larger than the response wait time W, the master terminal 100 cannot receive the response signal within the response wait time. Accordingly, when R≤340 (W−D), the master terminal 100 can receive the response signal from the slave terminal 200 within the response wait time W. In contrast, when R>340 (W−D), the master terminal 100 cannot receive the response signal from the slave terminal 200 within the response wait time W.

For example, suppose that the minimum time Wmin of the response wait time W is 0.05 (s) and that the time D from when the slave terminal 200 receives the synchronization signal until a response signal is transmitted is 0.02 (s). When R≤10.2 (m), the master terminal 100 can receive the response signal from the slave terminal 200 within the response wait time Wmin. In contrast, when R>10.2 (m), the master terminal 100 cannot receive the response signal from the slave terminal 200 within the response wait time Wmin. Thus, by setting the minimum time Wmin to a sufficiently short time interval, when the response wait time W is the minimum time Wmin, it is possible to make adjustments such that response signals only from slave terminals 200 near the master terminal 100 are received.

As described above, the master terminal 100 receives the response signals a1 to a3 from the slave terminal 200*a* within the response wait time W, and stores the response signal reception time and/or the like in the response signal reception time list. Because the slave terminal 200*a* is close to the master terminal 100, the master terminal 100 can receive a response signal from the slave terminal 200*a* even if the response wait time W is short. Thus, when the master terminal 100 has been able to receive response signals from the slave terminal 200*a* in response to N or more consecutive synchronization signals within the response wait time W without omission, the response signal reception times and/or the like are stored in the response signal list, and when the time intervals between synchronization signal transmission times and the time intervals between response signal reception times are compared, these match within the error range.

In contrast, because the slave terminal 200*b* is not close to the master terminal 100, it takes time for the synchronization signals from the master terminal 100 to reach the slave terminal 200*b*. Consequently, the time when a response signal is transmitted to the master terminal 100 from the slave terminal 200*b* is also delayed. When the response wait time W is short as in the case of W2, the master terminal 100 cannot receive the response signal from the slave terminal 200*b* within the response wait time W. Consequently, when a short response wait time W such as W2 is included, the master terminal 100 produces omissions in reception of response signals from the slave terminal 200*b* in response to N or more consecutive synchronization signals. Consequently, the time intervals between reception times for response signals from the slave terminal 200*b* do not match the time intervals of the synchronization signal transmission times within the error range.

When the time intervals for response signals from the slave terminal 200*a* match the synchronization signal time intervals within the error range, if the master terminal 100 is not already connected to the slave terminal 200*a*, the master terminal 100 recognizes the slave terminal 200*a* as a connection target and establishes a connection. Following this, the terminal ID of the slave terminal 200*a* is added to the connection target IDs. In contrast, because the time intervals of response signals from the slave terminal 200*b* do not match the synchronization signal time intervals within the error range, the master terminal 100 does not the slave terminal 200*b* as a connection target.

By setting the minimum time Wmin of the response wait time W to a sufficiently short time interval such as 0.05 s, for example, and by making the probability that the response wait time will become Wmin at least one time out of N times, the master terminal 100 can distinguish between the slave terminal 200*a* nearby and the slave terminal 200*b* at a location distant from the master terminal 100, can select and recognize as a connection target only the slave terminal 200*a* near to the master terminal 100, and can establish a connection with that connection target.

Second Exemplary Embodiment

A wireless communication system 2 according to a second exemplary embodiment of the present disclosure will be described with reference to the drawings. Components the same as in the first exemplary embodiment are labeled with the same reference symbols, and detailed description is omitted.

Figure 14:
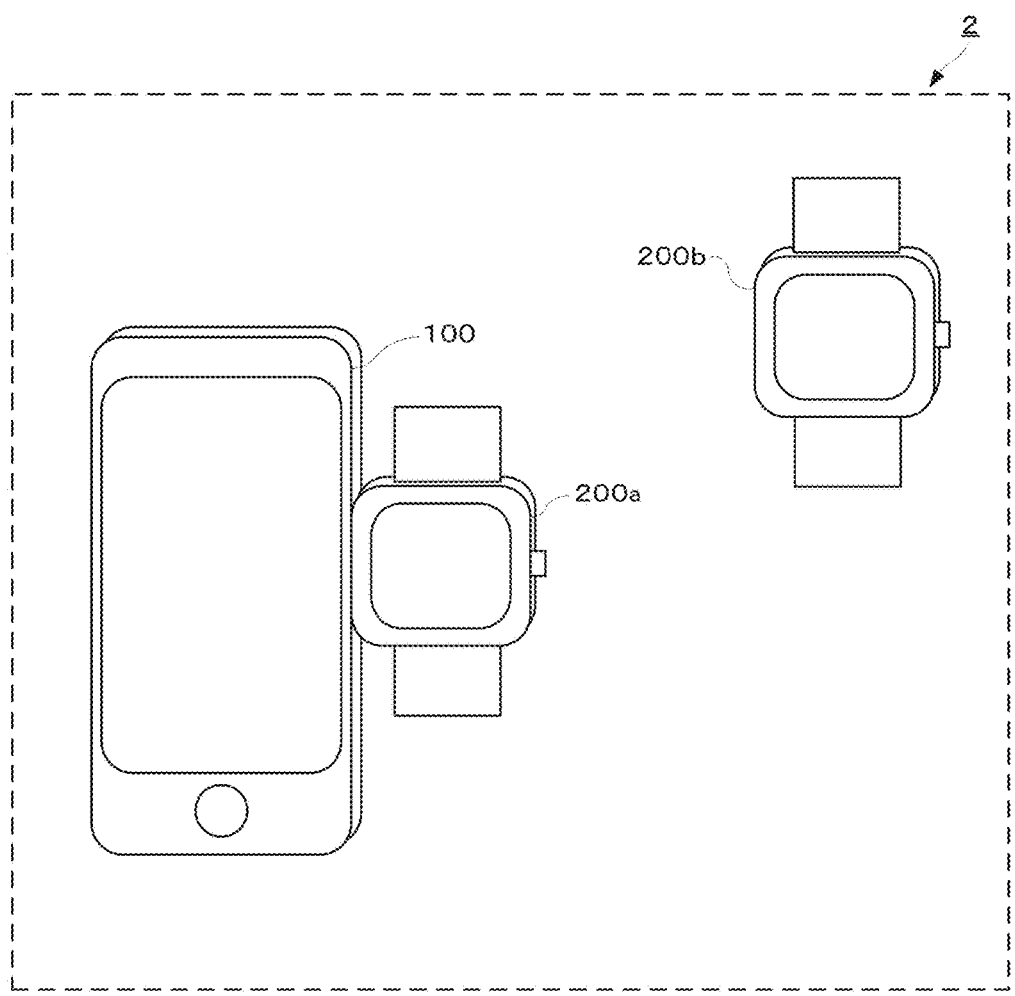
FIG. 14 is a drawing showing a configuration of a wireless communication system according to a second exemplary embodiment of the present disclosure.

FIG. 14 is a drawing showing the configuration of the wireless communication system 2 according to the second exemplary embodiment of the present disclosure. In the example of FIG. 14, the wireless communication system 2 comprises a master terminal 100 that is a wireless communication device, and slave terminals 200*a* and 200*b* that are wireless communication devices. The master terminal 100 and multiple slave terminals 200*a* and 200*b* accomplish wireless communication with each other based on the short-distance wireless communication standard known as Bluetooth.

The master terminal 100 is, for example, a smartphone or a tablet personal computer. On the other hand, the slave terminals 200a and 200b are, for example, wearable terminals such as wristwatch terminals and/or the like. When it is not necessary to specifically differentiate the slave terminals 200a and 200b, these will be collectively referred to in the description below as the slave terminal 200.

In the first exemplary embodiment, the master terminal 100 transmits sound waves as synchronization signals to the slave terminal 200. The slave terminal 200 receives the sound waves with a microphone, and transmits electromagnetic waves as a response signal. The master terminal 100 receives the electromagnetic waves as a response signal and recognizes as connection targets slave terminals 200 for which the time intervals of the synchronization signals and the response signals match. Consequently, the master terminal 100 can recognize slave terminals 200 in the space to which sound waves are conveyed as connection targets. In contrast, with the second exemplary embodiment, the master terminal 100 transmits vibrations as synchronization signals to the slave terminals 200. The slave terminals 200 detect the vibrations through acceleration sensors, and transmit vibrations as response signals. The master terminal 100 detects the vibrations as response signals through an acceleration sensor, and recognizes as connection targets slave terminals 200 for which the time intervals of the synchronization signals and the response signals match. Consequently, because vibrations are detected by acceleration sensors, the master terminal 100 recognizes only the slave terminal 200a physically in contact therewith as a connection target and can establish a connection.

Figure 15:
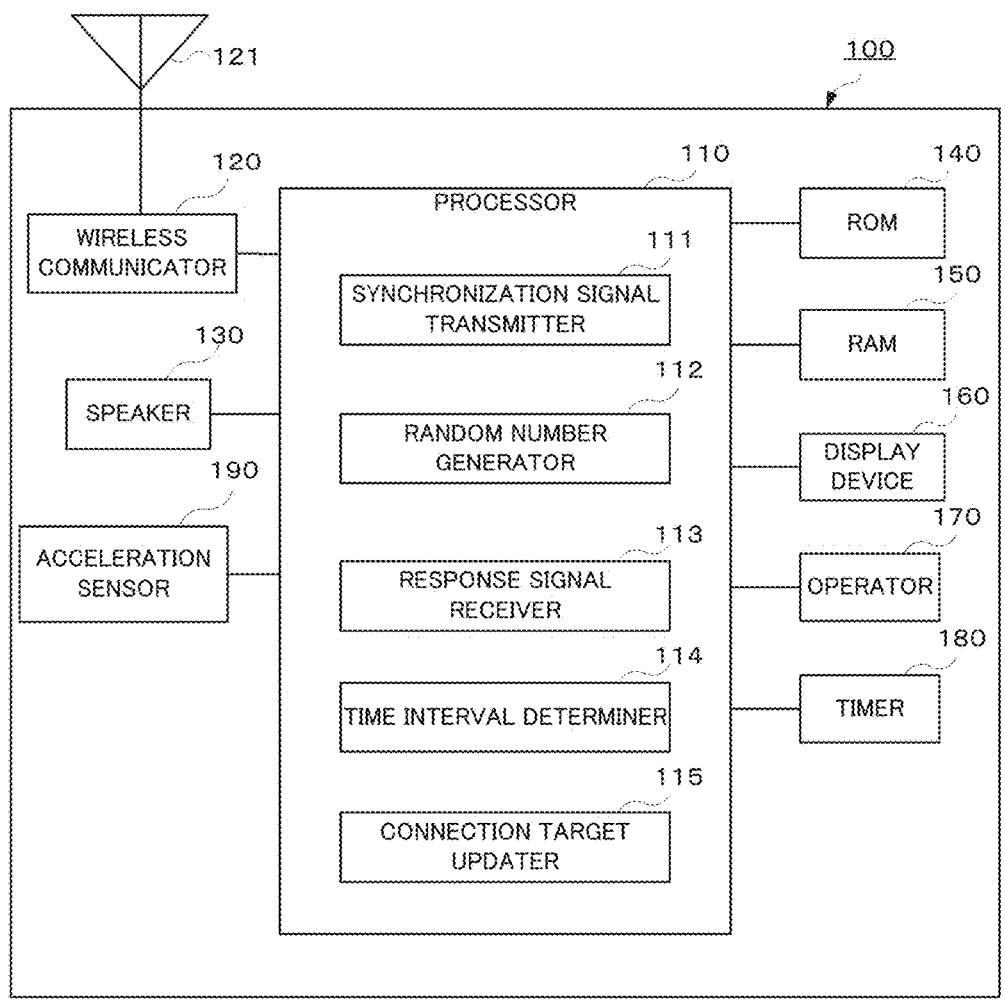
FIG. 15 is a block diagram showing a configuration of a master terminal according to the second exemplary embodiment of the present disclosure.

As shown in FIG. 15, compared to the master terminal 100 of the first exemplary embodiment, the master terminal 100 of the second exemplary embodiment further comprises an acceleration sensor 190.

The acceleration sensor 190 receives vibrations that are response signals transmitted from slave terminals 200 that are touching the master terminal 100. Specifically, the acceleration sensor 190 receives response signals by detecting vibrations from the slave terminal 200a that is touching the master terminal 100. With this exemplary embodiment, the acceleration sensor 190 cannot detect vibrations from slave terminals 200 that are not touching the master terminal 100, and consequently cannot receive response signals from slave terminals 200 that are not touching the master terminal 100. For the acceleration sensor 190, it would also be fine to use an acceleration sensor that is built into a smartphone and/or the like, for example.

Figure 16:
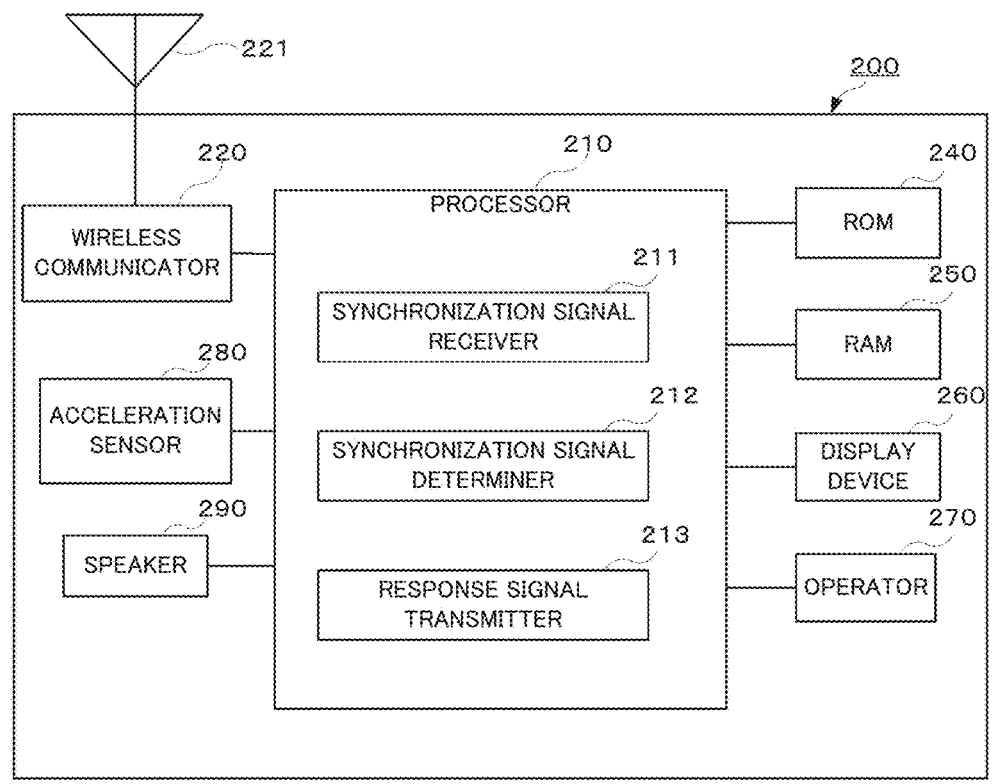
FIG. 16 is a block diagram showing a configuration of a slave terminal according to the second exemplary embodiment of the present disclosure.

Next, the configuration of the slave terminal 200 is described. As shown in FIG. 16, the slave terminal 200 further comprises an acceleration sensor 280 and a speaker 290.

The acceleration sensor 280 receives vibrations that are synchronization signals transmitted from the master terminal 100 that is touching the slave terminal 200. Specifically, the acceleration sensor 280 receives synchronization signals by detecting vibrations from the master terminal 100 that is touching the slave terminal 200. In this exemplary embodiment, the acceleration sensor 280 cannot detect vibrations from a master terminal 100 that is not touching the slave terminal 200, so the acceleration sensor 280 cannot receive synchronization signals from a master terminal 100 that is not touching the slave terminal 200. For the acceleration sensor 280, it would also be fine to use an acceleration sensor built into a wearable terminal and/or the like, for example.

The speaker 290 transmits, as a response signal, vibrations that can be detected as vibrations by the acceleration sensor 190 of the master terminal 100. For the speaker 290, it would also be fine to use a speaker built into a wearable terminal and/or the like, for example.

Figure 17:
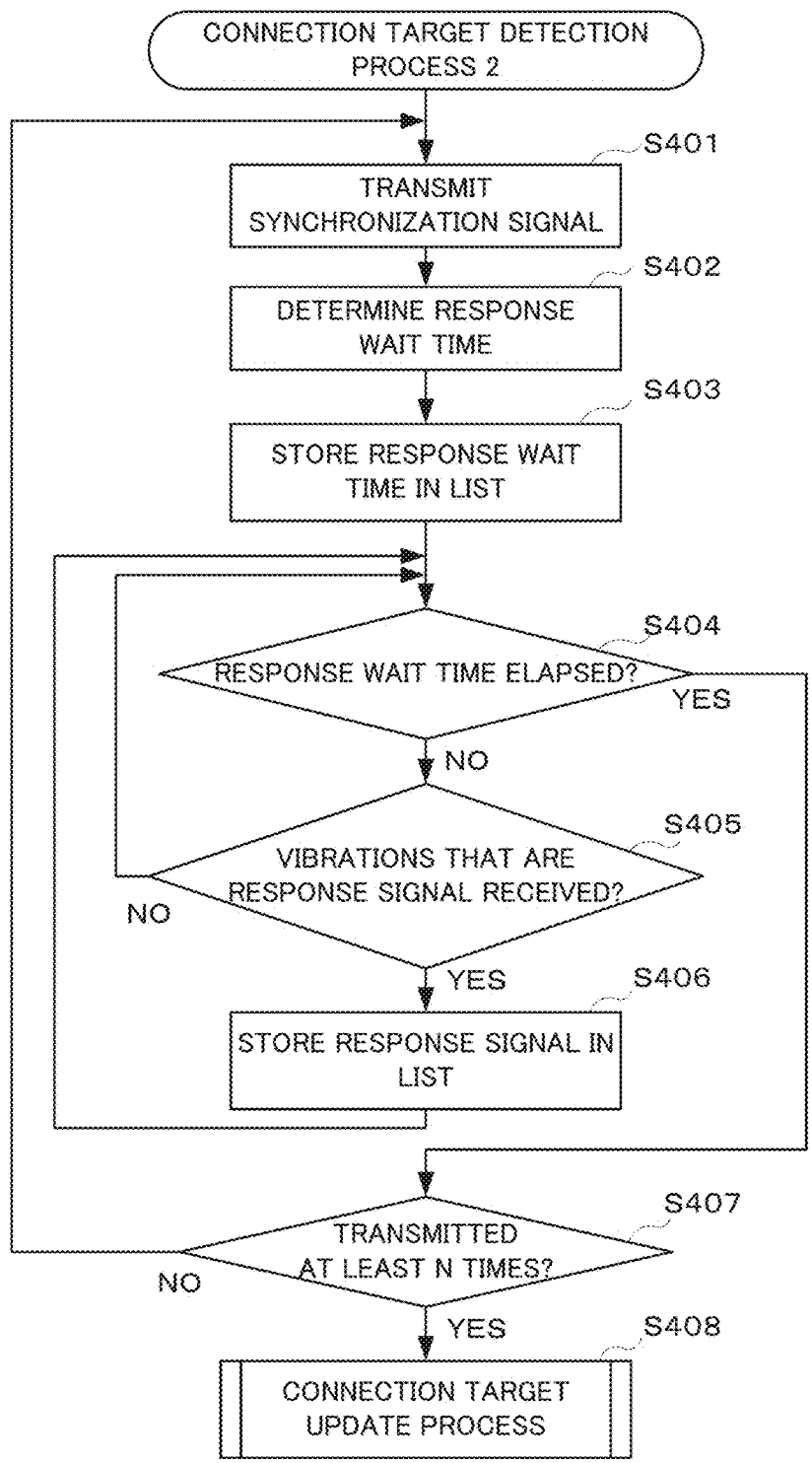
FIG. 17 shows a flowchart of a connection target detection process according to the second exemplary embodiment of the present disclosure.

Next, a connection target detection process 2 that is a process prerequisite to the master terminal 100 recognizing the slave terminal 200 as a connection target is described with reference to the flowchart in FIG. 17.

The master terminal 100 starts the connection target detection process simultaneously with startup or in response to a user operation. The synchronization signal transmitter 111 transmits vibrations that are a synchronization signal to the slave terminal 200, and the time the synchronization signal was transmitted is stored in the synchronization signal transmission time list (step S401). The master terminal 100 determines the response wait time W (step S402), and the response wait time W is stored in the response wait time W list (step S403).

Next, a determination is made as to whether the response wait time W has elapsed (step S404). When it is determined that the response wait time has not elapsed (step S404: No), the master terminal 100 accomplishes the following process.

The response signal receiver 113 determines whether vibrations that are a response signal transmitted from the slave terminal 200 were received during the response wait time W (step S405). When vibrations were not received (step S405: No), the master terminal 100 returns to the process of step S404. When vibrations were received (step S405: Yes), the terminal ID and the response signal reception time are stored in the response signal reception time list (step S406). Following this, the master terminal 100 returns to the process of step S404. Thus, the processes in steps S404 to S406 are looped until the response wait time elapses. Specifically, in the case of the wireless communication system 2 shown in FIG. 14, the master terminal 100 detects with the acceleration sensor 190 vibrations from the slave terminal 200a physically touching the master terminal 100, and stores the terminal ID of the slave terminal 200a and the reception time of sound waves that are the response signal in the response signal reception time list.

When it is determined that the response wait time has elapsed (step S404: Yes), the master terminal 100 determines whether synchronization signals have been transmitted N or more times (step S407). When synchronization signals have been transmitted N or more times (step S407: Yes), the master terminal 100 accomplishes a connection target update process that determines whether or not the slave terminals 200 that transmitted response signals are connection targets (step S408). When synchronization signals have not been transmitted N or more times (step S407: No), the master terminal 100 returns to step S401. In this way, the processes of steps S410 to S407 loop until synchronization signals have been transmitted N or more times.

Figure 18:
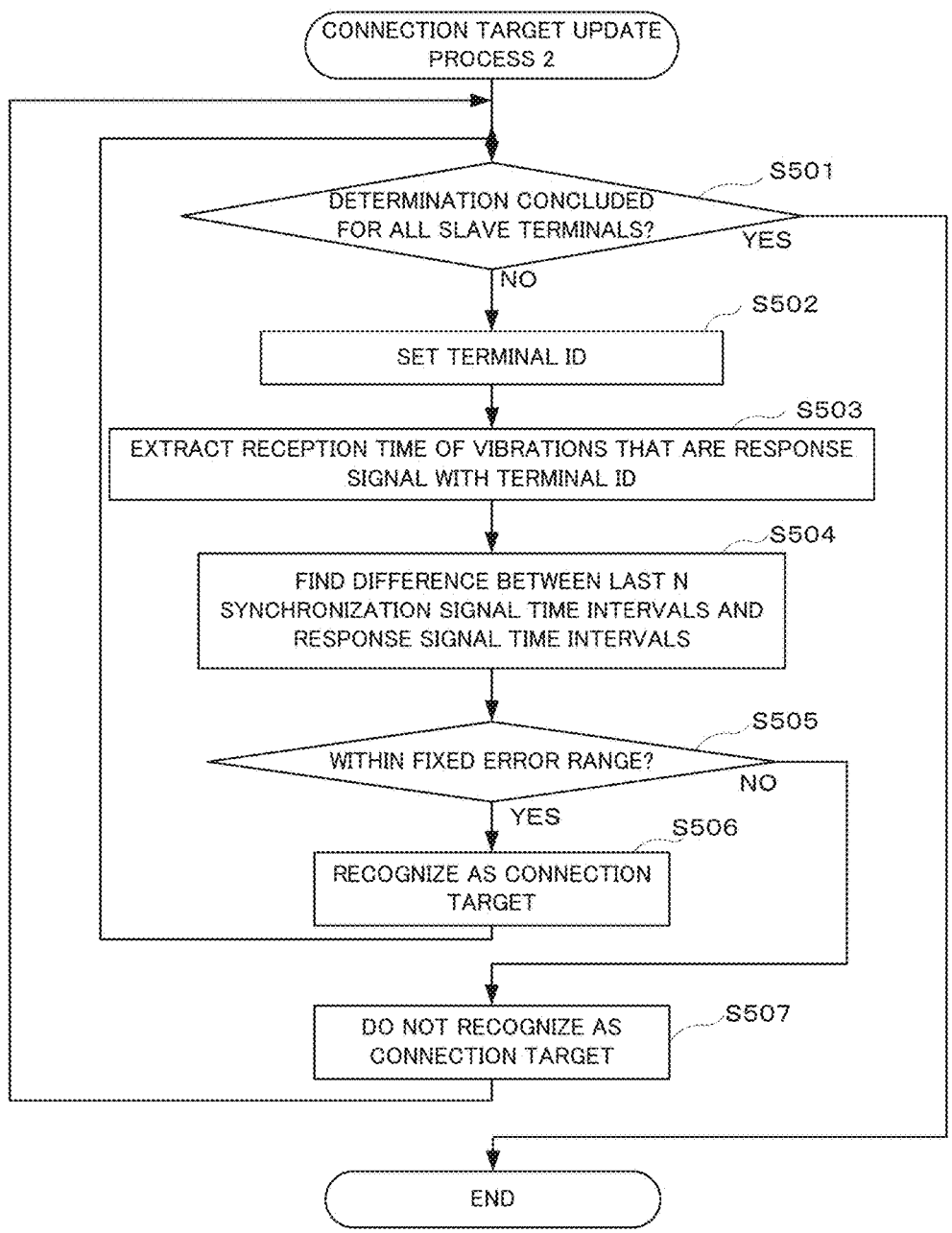
FIG. 18 shows a flowchart of a connection target update process according to the second exemplary embodiment of the present disclosure.

Next, a connection target update process 2 will be described with reference to the flowchart shown in FIG. 18. First, a determination is made as to whether it has already been determined for all slave terminals 200 whether the tine intervals of the synchronization signals and the response signals are within a fixed error range (step S501). Specifically, in the case of the wireless communication system 2 shown in FIG. 14, the master terminal 100 determines whether a determination has already been made as to whether the time intervals are within a fixed error range for the slave terminal 200a in physical contact with the master terminal 100. When a determination has not already been made regarding the slave terminal 200a (step S501: No), the master terminal 100 sets the terminal ID of the slave terminal 200s for which determination has not already been made (step S502). When there are multiple slave terminals 200 for which a determination has not been made, the master terminal 100 arbitrarily selects one of these and sets the terminal ID. Next, the master terminal 100 extracts the reception time of the vibrations that are the response signal of that terminal ID (step S503). The master terminal 100 finds the absolute values of the differences between the time intervals of the reception times of the vibrations that are the response signals of the terminal ID extracted the past N times, and the time intervals of the vibrations that are the past N synchronization signals (step S504). The master terminal 100 determines whether the average of the absolute values of the differences between the synchronization signal time intervals and the response signal time intervals is not greater than a fixed value (error range) (step S505).

When the synchronization signal time intervals and the response signal time intervals match within the error range (step S505: Yes), the master terminal 100 recognizes the slave terminal 200a for which the time intervals of the transmission times and the time intervals of the response times match as a connection target (step S506). The terminal ID of the slave terminal 200a recognized as a connection target is stored in the connection target ID list. The master terminal 100 displays the terminal ID of this slave terminal 200a and establishes a connection with the slave terminal 200a either automatically or by receiving a user operation. Following this, the master terminal 100 returns to step S501.

On the other hand, returning to step S505, when as a separate example the synchronization signal time intervals and the response signal time intervals do not match within the error range (step S505: No), the slave terminal 200 for which these time intervals do not match within the error range is not recognized as a connection target (step S507). Following this, the master terminal 100 returns to step S501.

When the determination of whether the synchronization signal time intervals and the response signal time intervals match has been made for all slave terminal IDs (step S501: Yes), the connection target update process concludes. When the master terminal 100 is touching multiple slave terminals 200, when a determination has not been made for all slave terminals 200 (step S501: No), the processes from step S502 on are accomplished for the remaining slave terminals 200. In the case of the wireless communication system 2 shown in FIG. 14, by repeating this process the master terminal 100 recognizes the slave terminal 200a that is physically touching the master terminal 100 as a connection target and establishes a connection, when the time intervals of the synchronization signals and the response signals match. In contrast, the master terminal 100 does not recognize as a connection target the slave terminal 200b that is not physically touching the master terminal 100.

Next, a synchronization signal response process 2 accomplished by the slave terminal 200 in order to establish a connection with the master terminal 100 will be described with reference to the flowchart shown in FIG. 19. The slave terminal 200 starts the process of receiving vibrations simultaneously with startup or in response to a user operation. First, the synchronization signal receiver 211 determines whether vibrations have been received (step S601). The synchronization signal receiver 211 determines whether vibrations were detected by the acceleration sensor 280. For example, in the case of the wireless communication system 2 shown in FIG. 14, the slave terminal 200a that is physically touching the master terminal 100 can receive vibrations because the acceleration sensor 280 can detect vibrations. In contrast, the slave terminal 200b that is not physically touching the master terminal 100 cannot receive vibrations because the acceleration sensor 280 cannot detect vibrations. When vibrations were not received (step S601: No), step S601 is repeated until vibrations are received.

When vibrations are received (step S601: Yes), the synchronization signal determiner 212 determines whether the vibrations received via the acceleration sensor 280 are a synchronization signal (step S602).

When it is determined that the vibrations are a synchronization signal (step S602: Yes), the response signal transmitter 213 promptly transmits through vibrations a response signal including the terminal ID of that terminal to the master terminal 100 from the speaker 290 (step S603), and the process concludes. When it is determined that the vibrations are not a synchronization signal (step S602: No), the process concludes. When touching the master terminal 100, the slave terminal 200 can establish a connection by repeating this process.

As described above, the slave terminal 200 detects vibrations from the master terminal 100 touching the slave terminal 200, by means of the acceleration sensor 280, and transmits vibrations that are a response signal. The master terminal 100 detects the vibrations from the slave terminal 200 touching the master terminal 100, by means of the acceleration sensor 190, and establishes a connection with the slave terminal 200 for which the synchronization signal time intervals and the response signal time intervals match within the error range. Consequently, the master terminal 100 can establish a connection with the slave terminal 200a that is physically touching the master terminal 100. In contrast, no connection is made with terminals other than slaves physically touching the master terminal 100. As a result, it is possible for connections to be established limited to the range in which the acceleration sensor can detect vibrations (in this exemplary embodiment, the range of devices physically touching). Accordingly, a user can establish a connection between the master terminal 100 and the slave terminal 200 by causing these terminals to touch each other, without doing a setting operation such as inputting a PIN and/or the like.

In addition, it would be fine for the acceleration sensor 190 with which the master terminal 100 is provided to be changed to a microphone, and for the acceleration sensor 280 with which the slave terminal 200 is provided to be changed to a microphone. In this case, the master terminal 100 can establish a connection with the slave terminal 200 when the slave terminal 200 is at a distance at which synchronization signals that are vibrations transmitted from the master terminal 100 can be received and the master terminal 100 is at a distance at which response signals that are vibrations transmitted from the slave terminal 200 can be received.

In addition, it would be fine for the speaker 130 of the master terminal 100 to be substituted with a vibration motor and/or the like that generates vibrations that the acceleration sensor 280 of the slave terminal 200 can detect. Similarly, it would be fine for the speaker 290 of the slave terminal 200 to be substituted with a vibration motor and/or the like. Through this, it is possible to accomplish the above-described process relating to connection through vibrations substituted for the sound waves of speakers.

(Variation)

The master terminal 100 of the above-described exemplary embodiments transmits synchronization signals by means of sound waves, but it would be fine to transmit synchronization signals by means of optical signals. Here, optical signals are, for example, infrared rays, visible light rays, ultraviolet rays and/or the like. When the synchronization signals are transmitted by optical signals, the master terminal 100 can set only slave terminals 200 within the range to which optical signals from the master terminal 100 can reach as connection terminals, and can establish connection only with these connection targets. For example, when the master terminal 100 is placed at a location partitioned so that optical signals cannot leak to the outside, only slave terminals 200 in that partitioned location can be made connection targets.

The master terminal 100 of the above-described exemplary embodiments transmits synchronization signals at random time intervals, but it would be fine to transmit at fixed time intervals. The spacing of these fixed time intervals may change at fixed times. The fixed times are each time the power source of the master is turned on, for example. In addition, the master terminal 100 of the above-described exemplary embodiments receives response signals from slave terminals 200 during the response wait time from transmission of the synchronization signals, but it would be fine for the master terminal 100 to receive response signals from slave terminals 200 without setting a response wait time. In this case, the master terminal 100 can make only slave terminals 200 in the range to which synchronization signals reach connection targets. In addition, the master terminal 100 can make only slave terminals 200 that receive the synchronization signals and transmit response signals in response to the received synchronization signals connection targets.

The master terminal 100 of the above-described exemplary embodiments transmits synchronization signals at random time intervals, but it would be fine to transmit at equal time intervals. In addition, the master terminal 100 of the above-described exemplary embodiments is such that the time intervals for transmitting synchronization signals and the response wait times W are the same, but it would be fine for the master terminal 100 to make the time intervals for transmitting synchronization signals and the response wait times W independent values.

In order to ensure safer pairing, it is preferable to randomly change the PIN (personal identification number) of the master terminal 100 and the slave terminal 200. In this case, it is preferable for the PIN to be encrypted and transmitted from the slave terminal 200 to the master terminal 100. By encrypting and transmitting the PIN, it is possible to reduce fears of the PIN becoming known to a third party, thereby further enhancing safety.

In order to encrypt the PIN and transmit the PIN from the slave terminal 200 to the master terminal 100, first the master terminal 100 transmits a synchronization signal including a public key for encryption to the slave terminal 200. The slave terminal 200 receives the public key for encryption from the synchronization signal received, and encrypts the PIN using the received public key. The slave terminal 200 transmits a response signal including the encrypted PIN to the master terminal 100. The master terminal 100 receives the response signal including the encrypted PIN. The master terminal 100 unlocks (decrypts) the encrypted PIN included in the received response signal using a private key, and receives the PIN. The master terminal 100 then establishes a connection with the slave terminal 200 using the received PIN.

In addition, the central sections for accomplishing the connection target detection process and the connection target update process executed by the wireless communication device comprising the processor 110, the ROM 140, the RAM 150 and/or the like can be executed without a dedicated system, using a common mobile information terminal, a personal computer and/or the like. For example, the wireless communication device may be configured such that a computer program for executing the aforementioned actions is stored and distributed on a non-transitory computer-readable recording medium (flexible disk, CD-ROM, digital versatile disc read only memory (DVD-ROM)) and/or the like, and the aforementioned process is executed by installing the computer program on a mobile information terminal and/or the like. In addition, the wireless communication device may be configured such that the computer program is stored on a storage device possessed by a server on a communication network such as the Internet and/or the like and is downloadable to a regular information processing terminal and/or the like.

In addition, when the functions of the wireless communication device are realized through allocation to an operating system (OS) and application programs or cooperation between an OS and application programs, it would be fine for the application program portion alone to be stored on a recording medium or a storage device. In addition, it would be fine for the processor 110 to not be included in the wireless communicator 120, and for the processor 210 to not be included in the wireless communicator 220. In addition, it would be fine for the processor 110 and the processor 210 to be controlled by multiple processors.

In addition, it is possible for the computer program to be overlaid on carrier waves and to be distributed via a communication network. For example, it would be fine to post the computer program on a bulletin board system (BBS) on a communication network and to distribute the computer program via the network. In addition, it would be fine to have a configuration such that the processes can be executed by starting the computer program and executing the computer program similar to other application programs, under control of the OS.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A wireless communication device for controlling connection with at least one terminal, wherein the wireless communication device comprises:
one or more processors configured to:
control a transmitter to transmit a plurality of synchronization signals, wherein timings at which N pairs of sequentially transmitted synchronization signals, of the plurality of synchronization signals, are transmitted define corresponding N (where N is an integer of 2 or more) synchronization signal time intervals, wherein the one or more processors are configured to set a timing at which one synchronization signal and another subsequently transmitted synchronization signal of the plurality of synchronization signals are transmitted to define a shortened synchronization signal time interval on the basis of a time for the one synchronization signal to reach a radial distance from the wireless communication device,
wherein the radial distance defines a range within which the at least one terminal will be recognized as a connection target;
store at least M synchronization signal time intervals of the N synchronization signal time intervals, where M<N (where M is an integer of 1 or more);
determine that a receiver received a plurality of response signals, wherein each of the plurality of response signals is received before elapse of a corresponding one of the N synchronization signal time intervals;
store a timing of the each of the plurality of response signals received,
wherein timings of M pairs of sequentially received response signals of the plurality of response signals define M response signal time intervals;
perform a comparison of the M synchronization signal time intervals with the M response signal time intervals;
determine whether to recognize the at least one terminal as the connection target based on a result of the comparison; and
establish connection with the at least one terminal recognized as the connection target based on the result of the comparison.

2. The wireless communication device according to claim 1,
wherein the one or more processors are configured to recognize the at least one terminal as the connection target when it is determined that the M synchronization signal time intervals and the M response signal time intervals match.

3. The wireless communication device according to claim 1,
wherein the one or more processors are configured to control the transmitter to transmit the plurality of synchronization signals by sound waves.

4. The wireless communication device according to claim 1,
wherein the one or more processors are configured to control the receiver to receive the plurality of response signals that the at least one terminal has transmitted by sound waves.

5. The wireless communication device according to claim 1,
wherein the one or more processors are configured to control the receiver to receive the plurality of response signals by detecting vibrations transmitted from the at least one terminal.

6. The wireless communication device according to claim 1,
wherein the one or more processors are configured to control the transmitter to transmit the plurality of synchronization signals at random time intervals.

7. The wireless communication device according to claim 1,
wherein the one or more processors are configured to:
control the transmitter to transmit a public key for encryption included in the plurality of synchronization signals;
control the receiver to receive the plurality of response signals including a personal identification number encrypted by the at least one terminal using the public key; and
decrypt the personal identification number using a private key corresponding to the public key, and establish connection with the at least one terminal recognized as the connection target, using the decrypted personal identification number.

8. The wireless communication device according to claim 1,
wherein the transmitter and the receiver are configured to accomplish wireless communication.

9. A non-transitory computer-readable medium storing instructions that cause a computer to control connection with at least one terminal, wherein the instructions cause the computer to:
control a transmitter to transmit a plurality of synchronization signals, wherein timings at which N pairs of sequentially transmitted synchronization signals, of the plurality of synchronization signals, are transmitted define corresponding N (where N is an integer of 2 or more) synchronization signal time intervals,
wherein the instructions cause the computer to set a timing at which one synchronization signal and another subsequently transmitted synchronization signal of the plurality of synchronization signals are transmitted to define a shortened synchronization signal time interval on the basis of a time for the one synchronization signal to reach a radial distance from the wireless communication device,
wherein the radial distance defines a range within which the at least one terminal will be recognized as a connection target;
store at least M synchronization signal time intervals of the N synchronization signal time intervals, where M<N (where M is an integer of 1 or more);
determine that a receiver received a plurality of response signals, wherein each of the plurality of response signals is received before elapse of a corresponding one of the N synchronization signal time intervals;
store a timing of the each of the plurality of response signals received,
wherein timings of M pairs of sequentially received response signals of the plurality of response signals define M response signal time intervals;
perform a comparison of the M synchronization signal time intervals with the M response signal time intervals;
determine whether to recognize the at least one terminal as the connection target based on a result of the comparison; and
establish connection with the at least one terminal recognized as the connection target based on the result of the comparison.

* * * * *